UNITED STATES PATENT OFFICE.

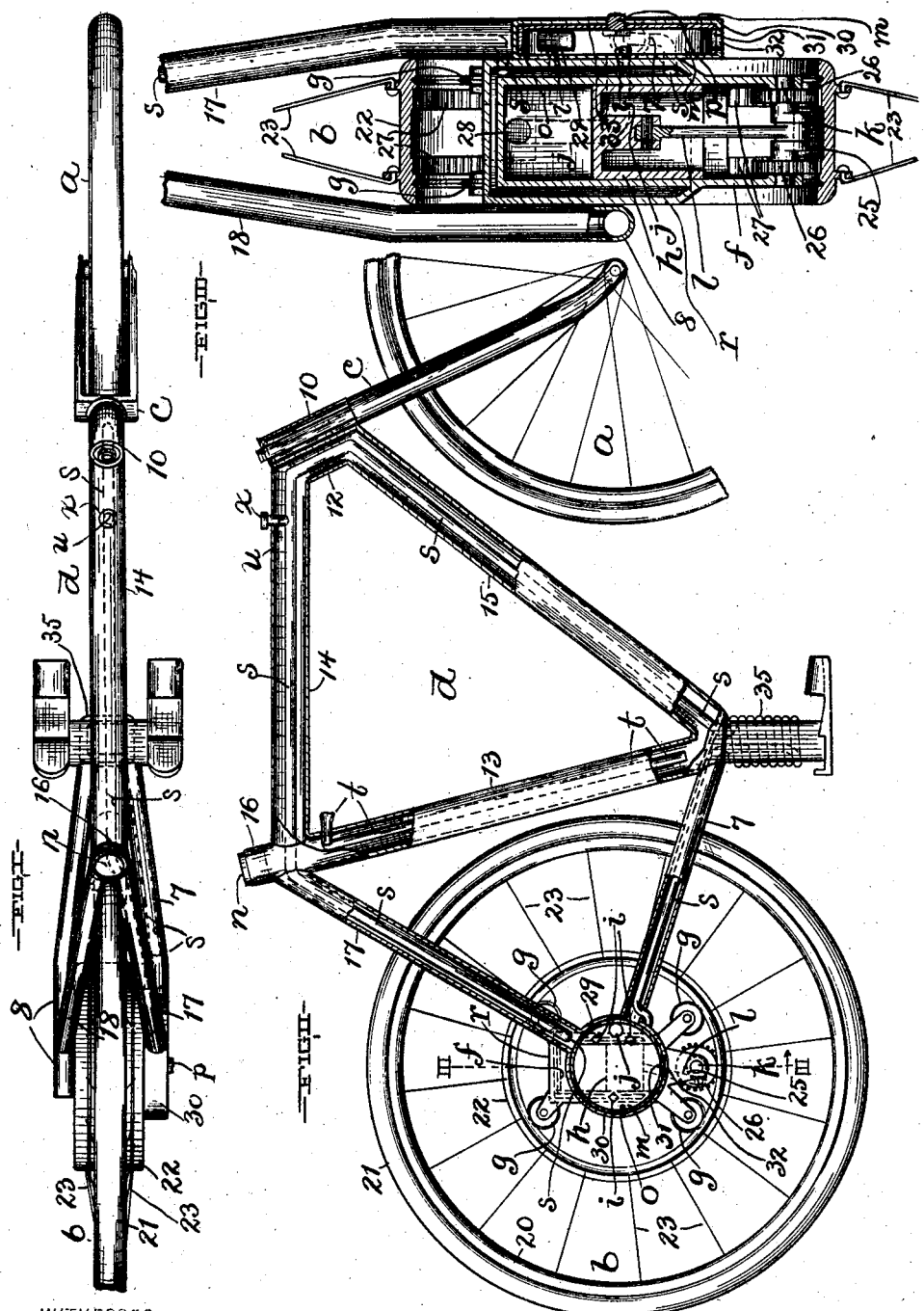

FRANK C. GODDARD, OF AKRON, OHIO.

MOTOR-VEHICLE.

SPECIFICATION forming part of Letters Patent No. 709,897, dated September 30, 1902.

Application filed September 9, 1901. Serial No. 74,801. (No model.)

*To all whom it may concern:*

Be it known that I, FRANK C. GODDARD, a resident of Akron, in the county of Summit and State of Ohio, have invented certain new and useful Improvements in Motor-Vehicles; and I hereby declare the following to be a full, clear, and exact description of the invention, such as will enable others skilled in the art to which it pertains to make and use the same.

This invention relates to improvements in motor-vehicles—as, for instance, to a motor-bicycle having its driving-wheel operated by an explosive-engine.

One object of this invention is to arrange the motor and power-transmitting mechanism within a hub-forming shell provided centrally of the driving-wheel of the vehicle and operatively connected with the power-transmitting mechanism.

Another object of this invention is to have the stationary portion of the motor and power-transmitting mechanism rigid with the framework of the vehicle and form an axle having sheaves or members engaging the hub-forming shell internally and affording bearing to the hub.

Another object of this invention is to employ the framework of the vehicle or machine as an oil-reservoir and as a passage-way for conducting combustible and vaporous or gaseous fluid from the said reservoir to an explosive-engine which constitutes the motor of the vehicle.

Another object of this invention is to provide the cylinder of the engine with a cooling-jacket and to provide a pipe-line extending through the reservoir-forming, vapor-accumulating, and fluid-conducting members of the framework and having opposite ends thereof connecting with the chamber of the jacket, so that the water or other cooling fluid supplied to and heated in the jacket circulates to and transmits heat to the said pipe-line, so as to heat the oil in the said reservoir and facilitate the vaporizing of the oil and so as to also prevent the cooling-jacket from becoming overheated.

With these objects in view and to the end of realizing other advantages hereinafter appearing the invention consists in certain features of construction and combinations of parts hereinafter described, and pointed out in the claims.

In the accompanying drawings, Figure I is a top plan of a bicycle embodying the invention which constitutes the subject-matter of this application. Fig. II is a side elevation, partly in section, of a portion of the machine or vehicle. Fig. III is a rear elevation, largely in section on line III III, Fig. II, of a portion of the driving-wheel and engine and shows portions of the framework broken away and in section.

Referring to the drawings, $a$ designates the forward wheel of a bicycle; $b$, the rear or driving wheel of the machine or vehicle; $c$, the steering-fork; $d$, the framework of the machine, which framework is provided above the forward wheel with an upright tubular head 10, which affords bearing in the usual manner to the shank or stem of the said fork.

The rear or driving wheel $b$ comprises, preferably, the following: an outer circumferentially-extending rim 20, a tire 21, extending externally and circumferentially of the rim, a centrally-located annular hub-forming shell 22, and spokes 23, connecting the hub and the rim together.

Within the chamber of the hub 22 is arranged an upright explosive-engine of any approved form, which engine has its cylinder $f$ arranged preferably vertically. The cylinder $f$ is stationary, being rendered rigid with the framework $d$ of the machine or vehicle in any approved manner. The cylinder $f$ is provided at several points circumferentially of the shell 22 with sheaves $g$, which are arranged with their axes parallel with the axis of the wheel $b$ and engage the inner peripheral surface of the shell 22. The cylinder $f$ and the sheaves $g$ form, therefore, an axle within the shell or hub 22, which has bearing upon the said sheaves. This cylinder $f$ is provided internally with a piston $h$, arranged to operate endwise of the chamber of the cylinder in the usual manner. The engine is arranged with the shaft $k$ at the bottom. The shaft $k$ is arranged horizontally and parallel with the axis of the wheel $b$, and the piston $h$ is operatively connected by the pitman $l$ with the crank 25 of the said shaft. The shaft $k$ is operatively provided with fly-wheel-forming spur-gears 26, which mesh with internal annular gears 27, formed by portions of the hub 22 by providing the inner periphery of the said hub with gear-teeth. It will be observed, therefore, that the engine-shaft is intergeared with and within the hub 22 and that the wheel $b$ is driven in the one direction or the other, according as the said shaft is rotated in the one or the other direction.

The construction of the ports of the cylinder, the valve mechanism for controlling the supply of the combustible mixture to the cylinder, the valve mechanism for controlling the exhaust-port of the cylinder, and the means for producing the ignition of the explosive fluid upon the compressing stroke of the piston $h$ form no part of the subject-matter of and are not shown and described in this application. Suffice it to state that $j$ designates the induction-port of the cylinder. The port $j$ is shown in the main in dotted lines in Fig. III and has its discharging end shown in solid lines in the said drawing, as at 28, and has its receiving end shown in Fig. II. The port $j$ conducts the combustible mixture to the chamber of the cylinder from the mixing-chamber $m$, wherein the ingredients of the said mixture commingle. The chamber $m$ is formed by a cylindrical case 30, rigid with the cylinder $f$ and arranged at one end and centrally of the hub 22. The inner and outer side walls of the chamber $m$ are vertical and parallel, whereas the surrounding wall of the said chamber is cylindrical, and the port $j$ communicates with the said chamber at the inner side wall of the chamber.

The main portion of the framework $d$ of the bicycle illustrated comprises the following: a short upright tubular member 12, arranged at and extending along the rear side of the head 10, an upright and rearwardly-inclined tubular member 13, arranged forward of and near the rear wheel $b$, an upper horizontally or approximately horizontally arranged tubular member 14, connecting together and establishing communication between the upper ends of the members 12 and 13, and an inclined tubular member 15, connecting together and establishing communication between the lower ends of the said members 12 and 13. The members 12, 13, 14, and 15 are therefore in open relation with each other interiorly, and the members 13 and 15 form a V-shaped reservoir for holding gasolene or hydrocarbon oil. The framework is provided with a tubular saddle-post 16, arranged above the members 13 and in open relation interiorly with the said member 13. The post 16 forms the inlet of the V-shaped reservoir formed by the members 13 and 15, as already indicated, and the said inlet is normally closed at its outer end by a removable plug $n$. Obviously the removal of the plug $n$ opens the inlet 16 preparatory to supplying the reservoir with oil. The framework $d$ comprises also two tubular bars 17 and 18, which extend downwardly and rearwardly from the lower end of the saddle-post 16 at the junction of the members 13 and 14 to and overlap opposite ends, respectively, of the hub 22 of the wheel $b$, and one of the said bars—viz., the bar 17—forms a passage connecting the chamber $m$ with the upper end of the chamber of the reservoir 13 15 and is adapted to conduct the gaseous inflammable fluid or vapor from the upper end of the said reservoir to the said chamber $m$.

A rotary valve-forming ring $o$ fits snugly but turnably within the chamber $m$ and controls the supply of air and gaseous or vaporous combustible fluid to the said chamber. The ring $o$ has a lateral port 29, normally closed by the cylindrical wall of the case 30 and arranged as required to render it capable of being brought into registry with the discharging end of the passage-way formed by the bar 17 upon turning the said ring to the extent required. The ring $o$ has another port 31, normally registering with an aperture or air-inlet 32, formed in the surrounding wall of the chamber $m$ at the inlet 32, when the supply of gaseous or vaporous combustible fluid is cut off from the said chamber, and that the closing of the air-inlet 32 commences when the opening of the port 29 of the valve begins. The supply of air to the chamber $m$ decreases, therefore, with an increase in the supply of the combustible fluid to the said chamber. The valve $o$ is provided interiorly with a cross-bar or web 33, (see Fig. III,) operatively mounted upon a shaft $p$, which is supported and operated in any approved manner.

The bar 18 is closed at its upper end by a plug 18, (shown in dotted lines only, Fig. I,) so that fluid cannot enter the said bar from the reservoir 13 15.

The framework $d$ comprises also two tubular bars 7 and 8, extending from the lower end and outside of the reservoir 13 15 at the junction of and rigid with the said members 13 15 rearwardly to and overlapping opposite ends, respectively, of the hub 22. The bar 8 connects at its rear end with the bar 18, and the said bars 8 and 18 are rendered rigid with the cylinder in any suitable manner. The bar 7 is rigid with the case 30, to which the cylinder $f$ is bolted, as at $i$.

The cylinder $f$ is provided with a cooling-jacket $r$. A pipe-line $s$ has opposite ends thereof connecting with the upper and lower ends, respectively, of the chamber of the jacket. The pipe-line $s$ extends from the lower end of the jacket into and interiorly along the bar 7 and is formed into a coil 35, arranged below the junction of the frame members 13 and 15 and exposed to the external atmosphere, thence extends into and interiorly along the frame member 14, and thence into and interiorly along the bar 17 to the upper end of the chamber of the jacket. Fluid-tight joints are of course formed around the pipe-line *s* where the same extends into or out of any of the tubular frame members which contain combustible fluid.

An air-conducting tube or pipe *t* has its receiving end connecting with the external atmosphere at the upper end of the member 13 of the oil-reservoir and extends and discharges into the lower end of the said member 13.

Obviously the suction created within the engine-cylinder during the drawing stroke of the piston of the engine results in drawing air through the pipe *t* into the lower portion or oil-holding space of the reservoir 13 15, and the air discharged at the lower end of the pipe *t* ascends through the oil and becomes laden with oil-vapor, and the vapor-laden air is conducted by the passage-way formed by the bar 17 to the mixing-chamber *m*, where the admission of the said vapor is controlled, as already indicated, by the valve *o*.

The cooling-jacket *r* and the connected pipe-line *s* are supplied with water or any suitable cooling fluid in any approved manner, preferably through a short inlet-forming tube *u* with which the upper portion of the pipe-line is provided, and obviously the fluid heated within the jacket during the operation of the engine results in a circulation through the jacket and connected pipe-line which becomes more or less heated and transmits heat or warmth to the oil within the reservoir 13 15, and thereby facilitates the vaporizing of the oil. The pipe-line *s* in thus transmitting heat from the cooling-jacket obviously advantageously lowers the temperature of the heated cooling agent, and consequently is instrumental in preventing overheating of the jacket. The tube *u* is closed at its outer end by a cap *x*.

What I claim is as follows:

1. The combination, with the framework of a vehicle, a driving-wheel, and an explosive-engine having its cylinder rigid with the framework, of a mixing-chamber having an air-inlet, a port arranged to conduct the combustible mixture from the said chamber to the chamber of the cylinder, a passage-way for supplying the gaseous or vaporous fluid to the said mixing-chamber, and a valve having a port adapted to register with the discharging end of the said passage-way and having another port for registering with the aforesaid air-inlet, and the arrangement of parts being such that the said air-inlet will be in registry with one of the valve-ports when the other valve-port is in registry with the aforesaid passage-way.

2. The combination, with the framework of a vehicle, the driving-wheel having a centrally-located hub, and an explosive-engine having its cylinder rigid with the framework, of a cylindrical case forming a mixing-chamber having an air-inlet, a port arranged to conduct the combustible mixture from the said chamber to the chamber of the cylinder, a passage-way for supplying the gaseous or vaporous fluid to the said mixing-chamber, and a rotary valve-forming ring having a port adapted to register with the discharging end of the said passage-way and having another port for registering with the aforesaid air-inlet, and the arrangement of parts being such that the said air-inlet will be in registry with one of the valve-ports when the other valve-port is out of registry with the aforesaid passage-way.

3. A motor-vehicle having a framework comprising tubular members forming a reservoir, a driving-wheel, an explosive-engine which has its shaft operatively connected with the said wheel and has its cylinder rigid with the framework and provided with a port for supplying the combustible fluid to the chamber of the cylinder, a mixing-chamber communicating with the said port, a passage-way arranged to conduct gas or vapor from the aforesaid reservoir to the mixing-chamber, and means for regulating the supply of air and combustible fluid to the mixing-chamber.

4. In a motor-vehicle, a driving-wheel, an explosive-engine operatively connected with the said wheel and having a cooling-jacket, a reservoir for supplying the combustible fluid for use in operating the engine, and a pipe-line extending through the reservoir and having opposite ends thereof in open relation with the chamber of the jacket, substantially as and for the purpose set forth.

5. The combination of the driving-wheel of a motor-vehicle, an explosive-engine operatively connected with the said wheel, an oil-reservoir, a passage-way arranged to conduct vapor-laden air from the reservoir, means for supplying fluid from the said passage-way to the chamber of the cylinder, and an air-pipe arranged to discharge into the oil-space of the said reservoir.

6. The combination of a driving-wheel of a motor-vehicle, an explosive-engine operatively connected with the said wheel, a tubular framework forming an oil-reservoir and a passage-way arranged to conduct vapor-laden air from the upper portion of the said reservoir, means for supplying fluid from the said passage-way to the chamber of the cylinder, and an air-pipe arranged to discharge air into the oil-space or lower portion of the said reservoir.

7. In a motor-vehicle, a driving-wheel, an explosive-engine operatively connected with the said wheel and having a cooling-jacket, a reservoir, a passage-way for conducting fluid from the reservoir to the engine, and a pipe-line having opposite ends communicating with the chamber of the jacket and extending interiorly of the aforesaid reservoir.

8. In a motor-vehicle, a driving-wheel, an explosive-engine operatively connected with the driving-wheel and having a cooling-jacket, the tubular framework forming a reservoir and a passage-way for conducting fluid from the said reservoir to the engine, and a pipe-line having opposite ends communicating with the chamber of the jacket, which pipe-line extends interiorly of and along the aforesaid passage-way.

Signed by me at Cleveland, Ohio, this 3d day of September, 1901.

FRANK C. GODDARD.

Witnesses:
C. H. DORER,
V. C. LYNCH.